(12) United States Patent
Ferrarini

(10) Patent No.: US 7,022,366 B2
(45) Date of Patent: Apr. 4, 2006

(54) METHOD FOR TARTARIC STABILIZATION OF WINE

(75) Inventor: Roberto Ferrarini, Verona (IT)

(73) Assignee: Enologica Vason S.r.L., Pedemonte (IT)

(*) Notice: Subject to any disclaimer, the term of this patent is extended or adjusted under 35 U.S.C. 154(b) by 318 days.

(21) Appl. No.: 09/834,622

(22) Filed: Apr. 16, 2001

(65) Prior Publication Data

US 2001/0031293 A1    Oct. 18, 2001

(30) Foreign Application Priority Data

Apr. 14, 2000   (EP) ............................... 00830286.1

(51) Int. Cl.
*C12G 1/10*    (2006.01)
*C12H 1/00*    (2006.01)
(52) U.S. Cl. ...................................... 426/592; 426/424
(58) Field of Classification Search ................ 426/239, 426/592, 422, 423, 424
See application file for complete search history.

(56) References Cited

U.S. PATENT DOCUMENTS

| 4,775,541 A | * | 10/1988 | Brown et al. ................ 426/271 |
| 4,806,244 A | * | 2/1989 | Guilhem ..................... 210/638 |
| 5,480,665 A | | 1/1996 | Smith |
| 2003/0075506 A1 | | 4/2003 | Tudhope |

FOREIGN PATENT DOCUMENTS

| DE | 25 48 066 | 5/1977 |
| DE | 25 53 416 A | 6/1977 |
| FR | 2 709 308 A | 3/1995 |
| WO | WO 93/23151 A | 11/1993 |
| WO | WO 95/06110 | 3/1995 |
| WO | WO 01/78881 A1 | 10/2001 |

OTHER PUBLICATIONS

Amati, et al, "Autoarricchhimento dei mosti con membrane permeo-selective" (transl: Self-enriching of musts with permo-selective membranes) presented at $2^{nd}$ Congresso Italiano di Scienza degli Alimenti ($2^{nd}$ Italian Conference of Alimentrary Science), Cernobbio (CO), on Sep. 21-22, 1995.
"Filtration Spectrum", Perry's Chemical Engineer's Handbook, $7^{TH}$ Edition, McGraw-Hill, Section 22, 1998. (pp. 22-37), 1 page.
Filtration Spectrum Chart, [online] downloaded from Internet on Feb. 9, 2003, from Internet URL<http://www.hydrotechnology.com/newtext/filterspec.htm>.

(Continued)

*Primary Examiner*—Keith Hendricks
(74) *Attorney, Agent, or Firm*—Browdy and Neimark, PLLC

(57) ABSTRACT

A method for tartaric stabilization, in particular for wine, and an apparatus for its implementation are provided. The wine to be treated is placed in a container and conveyed into a filtering unit. A permeated liquid is sent to a tartaric stabilisation unit for treatment. The tartaric stabilisation unit can operated by means of ionic exchange resins, electrodialysis or other separation processes. The treated liquid is reunited with a retained liquid at the outlet of the filtering unit to obtain a treated wine. Also provided are a cyclical operation of the apparatus and a cyclical method.

10 Claims, 1 Drawing Sheet

OTHER PUBLICATIONS

Feuillat et al; "Effects of tangential microfiltration on chemical composition and sensory characteristics of Burgundy wines" *Bulletin de L'O.I.V.* 1987 Lab. D'Oenologie, Fac.Des.Sci. Mirande, vol. 60, No. 673/674, pp. 227-244.

\* cited by examiner

METHOD FOR TARTARIC STABILIZATION OF WINE

BACKGROUND OF THE INVENTION

The present invention relates to a method for tartaric stabilisation, in particular for wine, and an apparatus for its implementation.

It is known that in wines, in must, in grape juices in general and in other drinks, potassium, tartaric acid and calcium are present in high concentrations. During the fermentation phase, potassium bitartrate, also known as tartar, is formed. Calcium tartrate can also be formed during the fermentation.

The wine, being therefore a supersaturated solution of potassium bitartrate, is subject to the precipitation of this salt. Similarly, the presence of calcium may constitute a further risk for the precipitation of the tartaric acid salt.

The complete precipitation of the aforesaid salts in crystalline form is a phenomenon which generally requires a long time and is influenced by various factors. Amongst such factors, for instance, are the quantity of ethanol present in the wine, the temperature at which the wine is preserved and the acidity of the wine itself.

It should be observed, in particular, that the aforementioned salts are less soluble in ethanol than in water. Therefore, simultaneously with the formation of ethanol due to the fermentation of the wine, and also thereafter, their slow and progressive precipitation takes place.

The presence of crystals or bottom bodies due to this phenomenon constitutes a serious drawback, in that it is generally not to the liking of the consumer who is thus discouraged from consuming the wine itself. The precipitation of the potassium bitartrate and calcium tartrate salts, in effect, may generally continue even after the bottling of the wine, severely damaging the image of the product.

It is therefore necessary to subject the wine to tartaric stabilisation processes in order to prevent the precipitation of the aforementioned annoying salts.

A first known technique for the tartaric stabilisation of wines exploits the lowering of the temperature, which facilitates the precipitation of potassium bitartrate but not of calcium tartrate. This property is still the most widely used both with traditional and continuous systems.

This known technique presents some drawbacks, in that its efficiency is not very high. In some particular cases it is ineffective and it causes the elimination of some substances that actually have beneficial effects on wine quality.

A second known technique provides for treating the wine with the use of electrodialysis with membrane filters, as shown for instance in the patents FR2709308, FR2192170 and IT971999.

Lastly, methods for the tartaric stabilisation of wine are known with the use of ionic exchange resins.

This last solution presents some drawbacks.

The resin treatment applied to all the wine leads also to the removal of aromatic and colouring substances, negatively influencing the quality of the wine itself.

By contrast, electrodialysis, also due to the limitations of currently available membranes, is very costly, requiring extremely sophisticated machinery.

SUMMARY OF THE INVENTION

In this situation, the technical task at the basis of the present invention is to devise a method for tartaric stabilisation, in particular for wine, and an apparatus for its implementation, able substantially to overcome the aforementioned drawbacks.

In particular, a technical aim of the present invention is to devise a method for tartaric stabilisation, in particular for wine, and a highly effective apparatus of its implementation.

An additional technical aim of the present invention is to devise a method for tartaric stabilisation, in particular for wine, and an apparatus for its implementation which allow to maintain unaltered the quality of the treated wines.

A further technical aim of the present invention is to devise a method for tartaric stabilisation, in particular for wine, and an apparatus for its implementation which are simple to obtain and have reduced costs.

The specified technical task and the aims set out above are substantially achieved by a method for tartaric stabilisation, in particular for wine, and by an apparatus for its implementation whose characteristics are described in the enclosed claims.

BRIEF DESCRIPTION OF THE DRAWINGS

Further features and advantages of the invention shall become more readily apparent from the detailed description of a preferred but not exclusive embodiment of a method for tartaric stabilisation, in particular for wine, and of an apparatus for its implementation, illustrated in the accompanying drawing in which the sole figure FIG. 1 schematically shows an apparatus for the implementation of a method for tartaric stabilisation.

DESCRIPTION OF THE PREFERRED EMBODIMENT

Figure 1:
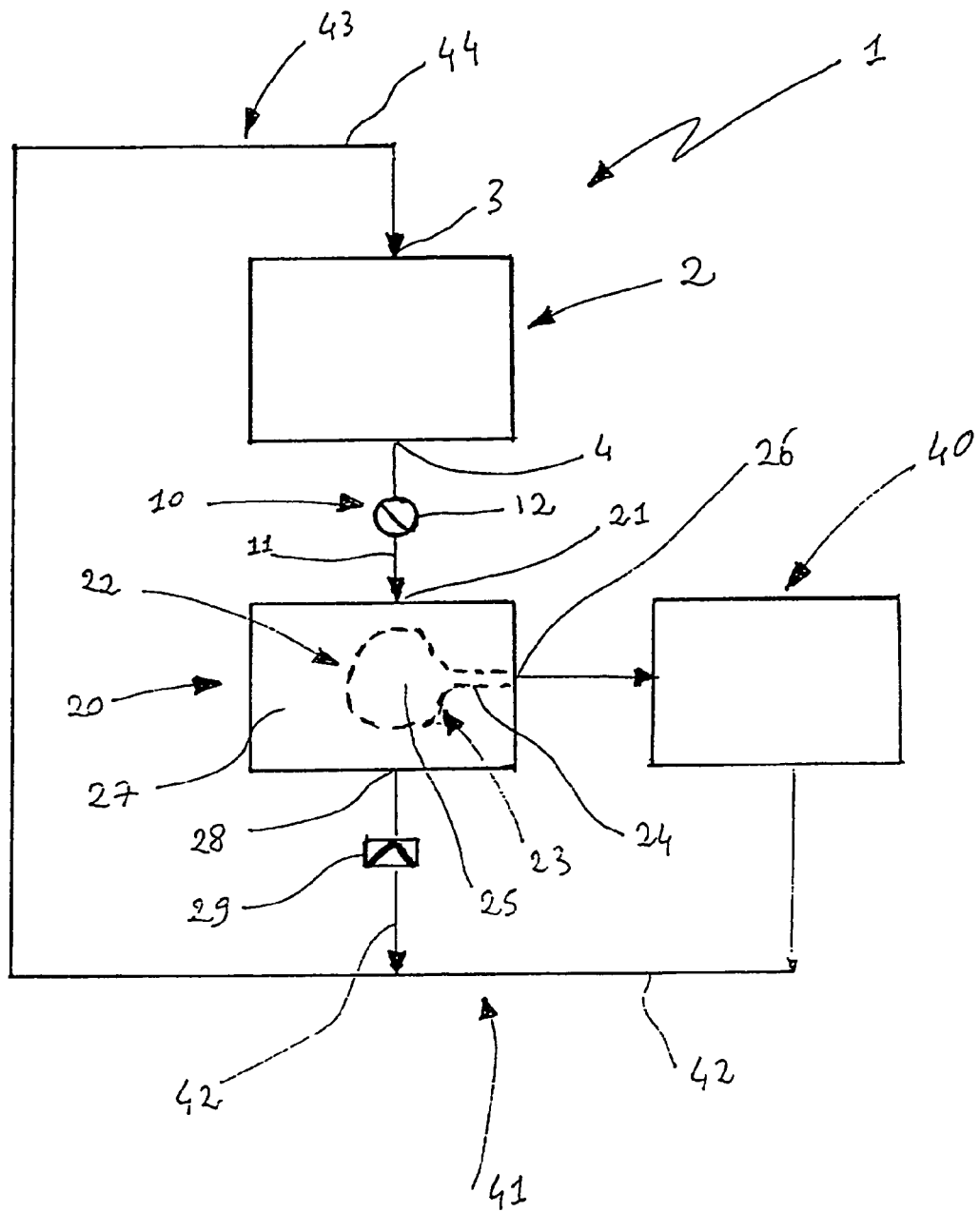

With reference to the accompanying FIGURE, the apparatus for the implementation of a method for tartaric stabilisation is globally indicated with the reference number 1.

The apparatus 1 comprises a container 2 able to hold a predetermined quantity of wine to be treated. The container 2 is provided with an inlet 3 and with an outlet 4. At the outlet 4 of the container 2 are operatively connected means 10 for conveying the wine to be treated to an inlet 21 of a filtration unit 20.

Advantageously such means 10 for conveying the wine can comprise connecting conduits 11 and a pump 12 for delivering the wine under pressure into the filtration unit 20.

The filtration unit 20 comprises in its interior a passage 22 wherein nanofiltration means 23 are conveniently provided. Advantageously, such nanofiltration means are constituted by a membrane 24, defining in its interior an enclosed space 25 communicating with a first outlet 26 of the filtration unit 20, wherefrom a permeated liquid is obtained.

The porosity of the membrane 24 is selected in such a way as to allow the passage of a suitable percentage of substances to be treated in the permeated liquid, while preventing the passage of the substances with greater atomic weight which are not to be altered.

The substances to be treated are typically potassium, calcium and tartaric acid, tartrate and malic acid. The membrane 24 is thus selected to allow the passage of diverse combinations of such substances in predetermined percentages, depending on the tartaric stabilisation treatment whereto the permeated liquid is subjected.

If for instance the stabilisation takes place by extraction of potassium ions from the permeated liquid, the membrane is selected to allow to maximise the percentage of such ions in the permeated liquid, compatibly with the need to withhold in a retained liquid the greatest possible quantity of substances that are beneficial to the quality of the wine.

The most suitable values of porosity for the purposes of the present invention can be identified in the range from 100 to 300 Dalton. Membranes whose porosity ranges between 120 and 220 Dalton are preferably adopted.

The portion 27 of the passage 22 exterior to the membrane 24 is operatively communicating with a second outlet 28 from the filtration unit 20, where retained liquid containing all the substances not permeated through the membrane 24 flows.

Operatively connected to the second outlet 28 of the filtering unit is advantageously provided a counter-pressure valve 29 adjustable to allow to generate, in the filtering unit 20, a suitable pressure to permit the tangential filtering of the wine.

The apparatus 1 further comprises a tartaric stabilisation unit 10, operatively positioned downstream of the first outlet 26 of the filtering unit 20 to receive and treat the permeated liquid, thereby obtaining a treated liquid.

The tartaric stabilisation unit acts on the permeated liquid to reduce the content of some substances involved in the formation of the potassium bitartrate or calcium tartrate salts, thus inhibiting a subsequent formation of the salts in the treated wine.

In a first embodiment, the stabilisation unit comprises a unit for treating liquids by means of cation exchange resins.

In this first case the cation exchange resins act on the permeated liquid reducing its content of potassium ions and calcium ions.

In a second embodiment the stabilisation unit comprises a unit for treating liquids by means of anion exchange resins.

In this second case the anion exchange resins act by reducing the content of tartrate ions, and hence of tartaric acid of the permeated liquid.

Lastly, in a third alternative embodiment, the stabilisation unit is constituted by an electrodialysis unit.

In this third case the electrodialysis unit acts on the permeated liquid by means of known chemical processes, reducing both their potassium ion and calcium ion content, and the tartrate ion and tartaric acid content.

Alternatively, the stabilisation unit can be constituted by units operating by means of other separation processes.

The apparatus 1 further comprises means 41 for reuniting the treated liquid to the retained fluid, exiting the filtering unit 20 and thereby obtaining a treated wine.

For instance, the means 41 for reuniting the liquid may comprise first conduits 42. Advantageously, the means 41 for reuniting treated liquid and retained liquid may comprise means 43 for reinserting the treated wine into the container 2, thereby obtaining a continuous wine treatment cycle.

Also such means 43 may, for instance, comprise second conduits 44 operatively connected to the first conduits 42.

The apparatus may also be provided with known means (not shown herein) for cooling the wine and the liquids in order to prevent the liquids from overheating as a result of the operation of the apparatus 1.

Such cooling means may for instance be constituted by heat exchangers conveniently located in the apparatus 1.

The apparatus 1 may also comprise valves for regulating liquid flows and safety valves, also not shown in the FIGURE.

Additionally, suitable means for regenerating the resin and the membranes used in the apparatus 1 may also be provided, as well as means for discharging the waste substances resulting from the process.

A method for tartaric stabilisation of wines according to the invention shall now be illustrated in detail.

A predetermined quantity of wine to be treated is initially placed in the appropriate container 2.

The wine to be treated is subsequently conveyed, under pressure, to the wine filtering unit 20.

The wine is subjected to a nanofiltration process which allows to separate the permeated liquid, to be treated, from the retained liquid, which shall not be subjected to any treatment.

Advantageously, the nanofiltration process can be carried out by means of the membranes 24, whose porosity is selected in such a way as to allow the passage of a suitable percentage of substances to be treated into the permeated liquid, typically potassium, calcium and tartaric acid or tartrate.

The liquid permeated through the membranes 24 is transferred into the tartaric stabilisation unit 40, where it is treated to reduce the content of the aforesaid substances involved in the formation of the potassium bitartrate and calcium tartrate salts, thereby obtaining the treated liquid.

In a first embodiment of the method, the permeated liquid is treated in a unit for treating liquids operating by means of cationic exchange resins.

The cationic exchange resins react with the potassium ions and the calcium ions allowing to reduce the quantity of the same ions dissolved in the permeated liquid.

In a second embodiment the permeated liquid is treated by a liquid treatment unit operating by means of anionic exchange resins.

The anionic exchange resins react with the tartrate ions and allow to reduce the quantity of such ions, and hence of tartaric acid, in the permeated liquid.

Alternatively, the permeated liquid can be treated by means of an electrodialysis unit, which acts on the permeated liquid by reducing its potassium ions and calcium ions and reducing its content of tartrate ions and tartaric acid.

Lastly, the treated liquid flowing out of the tartaric stabilisation unit 40 is reunited with the retained liquid coming from the filtering unit 20 to obtain the treated wine.

Advantageously, the phases of the method can be repeated in a cyclical manner until reaching the required level of stabilisation of the wine.

The invention allows to achieve important advantages.

First of all, it allows to obtain a very effective and efficient tartaric stabilisation of wine, allowing to optimise the operation and duration of the substances employed in the tartaric stabilisation phase, operating only on a part of the wine.

This entails a greater selectivity of the treatment, which allows not to act on some substances that are beneficial to the wines and thus not to alter the quality of the wines themselves.

Moreover, in this way, the regeneration of the resins or of the membranes can be performed less frequently with the consequent savings in terms of times and costs.

Additionally, by operating cyclically on the wine, the present invention allows to treat the wine until reaching the desired level of tartaric stabilisation.

It should also be noted that the present invention is easy to realise and also that the cost connected with the implementation of the invention is not very high.

What is claimed is:

1. A method for tartaric stabilisation of wine, comprising the following steps:
   a. Placing wine to be treated in an appropriate container;
   b. Conveying the wine into a filtering unit; subjecting the wine contained in said filtering unit to a nanofiltration process through a nanofiltration membrane, obtaining a permeated liquid and a retained liquid;

c. Transferring said permeated liquid to a tartaric stabilization unit;

d. Subjecting said permeated liquid to a tartaric stabilization step in said tartaric stabilization unit to obtain a treated liquid; and e. Reuniting said treated liquid with said retained liquid to obtained a treated wine wherein said tartaric stabilization treatment step is effected by treating the permeated liquid with cationic or an anionic exchange resin or by electrodialysis, thereby reducing the potassium or tartrate content of the permeated liquid.

2. A method as claimed in claim 1, wherein said tartaric stabilisation treatment occurs employing anionic exchange resins, reducing in particular the tartrate ion content of the permeated liquid.

3. A method as claimed in claim 1, wherein said tartaric stabilisation treatment phase occurs acting on the permeated liquid by means of electrodialysis, reducing both the potassium and calcium ion content and the tartrate ion content of the permeated liquid.

4. A method as claimed in claim 1, wherein said step of subjecting the wine to a nanofiltration process is conducted by means of membrane filtration.

5. A method as claimed in claim 1, wherein said phases are repeated cyclically.

6. A method for tartaric stabilization of wine comprising the following steps;

a. Placing the wine to be treated into an appropriate container;

b. Conveying the wine to a filtering unit;

c. Subjecting the wine contained in said filtering unit to a nanofiltration process through a nanofiltration membrane, thereby obtaining a permeated liquid and a retained liquid;

d. Transferring said permeated liquid to a tartaric stabilization unit;

e. Subjecting said permeated liquid to a tartaric stabilization phase by means of the tartaric stabilization unit to obtain a treated liquid, wherein said tartaric stabilization treatment phase includes acting on the permeated liquid with an ionic exchange resin, which cationic or anionic ionic exchange resin reduces the potassium ion content or the tartrate ion content of the permeated liquid; and f. Reuniting the treated liquid with said retained liquid to obtain a stabilized wine.

7. The method according to claim 6 wherein the ionic exchange resin is a cationic exchange resin for reducing the potassium ion content of the permeated liquid.

8. The method according to claim 6 wherein the ionic exchange resin is an anionic exchange resin for reducing the tartrate ion content of the permeated liquid.

9. The method according to claim 1 wherein the nanofiltration membrane has a porosity ranging from 100 to 300 Dalton.

10. The method according to claim 6 wherein the nanofiltration membrane has a porosity ranging from 100 to 300 Dalton.

* * * * *